United States Patent [19]
Bourekas et al.

[11] Patent Number: 5,649,232
[45] Date of Patent: Jul. 15, 1997

[54] STRUCTURE AND METHOD FOR MULTIPLE-LEVEL READ BUFFER SUPPORTING OPTIMAL THROTTLED READ OPERATIONS BY REGULATING TRANSFER RATE

[75] Inventors: Philip A. Bourekas, San Jose; Avigdor Willenz, Campbell; Yeshayahu Mor, Cupertino; Scott Revak, Castro Valley, all of Calif.

[73] Assignee: Integrated Device Technology, Inc., Santa Clara, Calif.

[21] Appl. No.: 422,673

[22] Filed: Apr. 13, 1995

Related U.S. Application Data

[63] Continuation of Ser. No. 717,776, Jun. 14, 1991, abandoned.
[51] Int. Cl.$^6$ ........................................ G06F 13/14
[52] U.S. Cl. .............. 395/880; 395/849; 395/878; 395/494; 395/450; 395/250; 395/821; 364/DIG. 1
[58] Field of Search ......................... 395/425, 550, 395/494, 450, 250, 821, 849, 878, 880; 364/DIG. 1 MS File

[56] References Cited

U.S. PATENT DOCUMENTS

| | | | |
|---|---|---|---|
| 4,288,860 | 9/1981 | Trost | 395/494 |
| 4,899,275 | 2/1990 | Sachs et al. | 395/403 |
| 5,016,165 | 5/1991 | Tanikawa et al. | 395/842 |
| 5,073,851 | 12/1991 | Masterson et al. | 395/467 |
| 5,179,709 | 1/1993 | Bailey et al. | 395/843 |

OTHER PUBLICATIONS

A. J. Smith, "Sequential Program Prefetching in Memory Hierarchies", IEEE Computer, Dec. 1978, pp. 7–21.
Gindele, "Buffer Block Prefetching Method", IBM Technical Disclosure Bulletin, Jul. 1977, vol. 20, No. 2, pp. 696–697.
Pomerene et al., "Base/Displacement Lookahead Buffer", IBM Technical Disclosure Bulletin, Apr. 1980, vol. 22, No. 11, p. 5182.

Primary Examiner—Tod R. Swann
Assistant Examiner—J. Peikari
Attorney, Agent, or Firm—Skjerven, Morrill, MacPherson, Franklin & Friel

[57] ABSTRACT

A structure and a method are provided for refilling a block of memory words stored in a cache memory. The structure and method provide a read buffer to optimally match the processor speed with the main memory using read clock enable RdCEn and acknowledge (Ack) signals. The RdCEn signal is provided as each memory word is available from the main memory. The Ack signal is provided to indicate the time at which the processor may empty the read buffer at the processor clock rate without subsequently executing a wait cycle to wait for any remaining memory words in the block to arrive. The benefit of the present invention is obtained without incurring a performance penalty on the single word read operation.

14 Claims, 11 Drawing Sheets

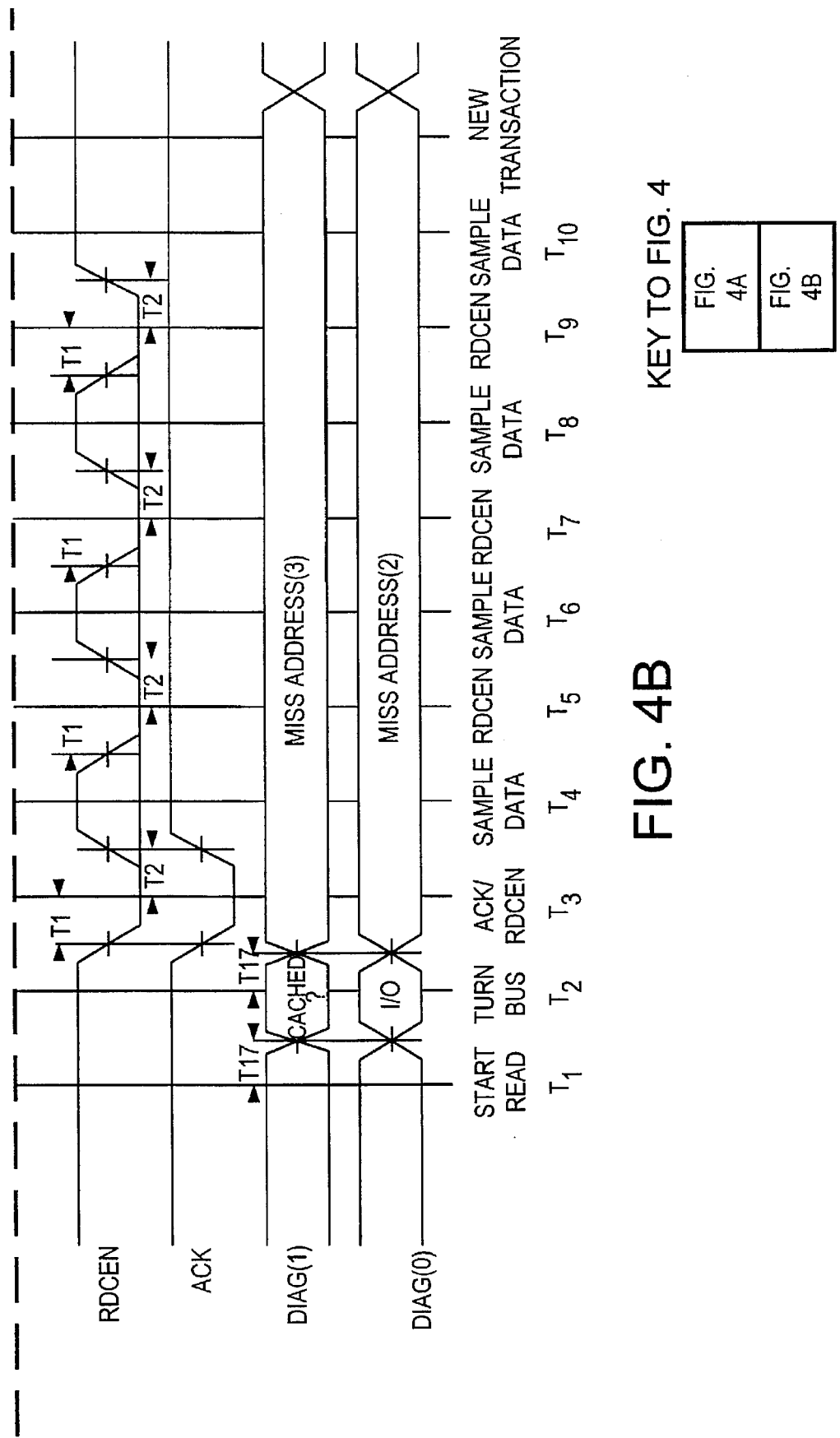

STRUCTURE AND METHOD FOR MULTIPLE-LEVEL READ BUFFER SUPPORTING OPTIMAL THROTTLED READ OPERATIONS BY REGULATING TRANSFER RATE

This application is a continuation of application Ser. No. 07/717,776, filed Jun. 14, 1991, now abandoned.

FIELD OF THE INVENTION

This invention relates to computer systems, and in particular relates to memory system designs.

BACKGROUND OF THE INVENTION

A cache memory, which exploits locality of memory references, is often used to improve performance in a computer system. In a cache memory scheme, copies of the memory words likely to be accessed in the immediate future are kept in the cache memory. In some computer systems, instructions and data are cached in separate cache memories. For example, in an instruction cache, a small number of instructions residing in the next consecutive memory locations are stored. Recently, "on-chip" cache memories integrated with the central processing unit (CPU) are also common in microprocessor designs.

Under one scheme, the central processing unit (CPU) first look into the cache memory for the data to be read, and if the data is not found in the cache memory, the main memory is then accessed. If the data sought is found in the cache memory, a "cache hit" is said to have occurred. Conversely, if the data being accessed is not found in the cache memory, a "cache miss" is said to have occurred. The desired data is then refilled from the main memory. Each refill from the main memory typically brings in a block of memory words, one of which is the memory word that generates the cache miss. Many techniques in memory organization, such as using dynamic random access memories (DRAMs) under page mode, or using interleaved memory architecture, allow the memory system to deliver after an initial access time ("latency") successive memory words at time intervals much shorter than the initial access time. Each bus transaction may require one or more processor clock periods. These memory access methods, i.e., delivering memory words at rapid succession after initial latency, are called "burst" mode accesses, if the memory system delivers one memory word per processor clock cycles. If the memory words are delivered at a rate slower than one memory word per clock cycle, the access method is called "throttled" access. Burst mode read access is especially suited for cache refilling.

In one cache organization scheme, known as the "direct-mapped" organization scheme, each location in the cache memory is mapped by the lower order bits of the memory address into multiple locations in the main memory. The remaining bits of the memory address form a "tag" field in the data word stored in the cache memory. Depending on the specific organization of the cache, each tag may be shared by a number of data words inside the cache. The number of data words sharing a tag is known as the "line size." Usually, the lower order bits of the memory word address index into the memory words of the cache line. Under the direct mapped scheme, the cache memory is accessed using the lower order bits, and a cache miss occurs when the higher order bits of the memory address do not match the tag field of the cache memory word.

The efficiency of the computer system is enhanced if the CPU does not wait for a memory reference. Therefore, the memory cycle of an instruction cache is typically matched to the instruction cycle of the CPU. To achieve this rate of operation, very high performance memory technology must be used. If the cache memory system very high "hit" rate, slower but less expensive components can be used to implement the main memory. However, if the main memory is implemented using a lower performance technology than the cache memory, the refilling operations may take multiple processor clock periods. Under such condition, the designer of the CPU may be required to stall the CPU when a cache miss occurs, in order to wait for the main memory access to complete. In addition, the CPU designer typically has to provide the memory system designer flexibility to choose from a variety of memory system technologies (e.g. DRAMs of numerous speeds) to achieve a broad range of performance and economic objectives.

Two schemes are commonly used in the prior art to minimize the CPU stall time and maximize the benefits of burst mode access. In one scheme, the memory system is designed such that, after the initial latency, the rate of data arrival matches the processor cycle, so that no stall cycles are required after the initial latency. In the other scheme, a first-in-first-out (FIFO) memory, also called a read buffer, is used. The FIFO buffer can be provided either on-chip or off-chip. The processor stalls until the FIFO buffer is filled. No further stall cycles are required after the FIFO is filled. Under this scheme, since no communication of data readiness flow from the main memory to the CPU, CPU timing must assume the worst-case performance of the main memory.

Because of these factors, the total cost or performance of the computer system can be significantly impacted by the timing of data transfer between the main memory and the cache memory.

SUMMARY OF THE INVENTION

In accordance with the present invention, a structure and a method provide a read buffer which receives a read clock enable ($\overline{RdCEn}$) signal indicating data readiness after each data word is transferred from the main memory, and an acknowledge ($\overline{Ack}$) signal indicating that access to data in the read buffer can be initiated at the processor clock rate without the need for further processor stall cycles.

In one embodiment, the $\overline{Ack}$ signal is considered received (i.e. "implicitly acknowledged") when the $\overline{RdCEn}$ signal indicates that the last memory word in a block of memory requested is ready.

The present invention can initiate, upon receiving the $\overline{Ack}$ signal, refilling the cache memory before every word in a block read is provided to the read buffer, even though the memory system does not deliver a memory word per processor clock period. Under this mode of operation, the $\overline{Ack}$ signal is timed to ensure that the last word read from the main memory under the block read will be available at the read buffer for use by the CPU if sequential access at the processor clock rate is initiated by the CPU upon receipt of the $\overline{Ack}$ signal. As a result, the CPU executes no wait cycle after the $\overline{Ack}$ signal is received. Therefore, the present invention optimally matches the speed of the on-chip cache with the external memory system. In one embodiment, in which the main memory can deliver after the initial access successive memory words at the processor rate, the read buffer is made "transparent" to the CPU by providing the $\overline{Ack}$ signal at the same time the first $\overline{RdCEn}$ signal is provided for the block read. The present invention achieves these benefits without incurring a performance penalty at the expense of single-datum reads. In addition, implicit acknowledgement is a simpler and more economical option for the memory designer who wishes to provide a system without the "Ack" signal.

The present invention is better understood upon consideration of the detailed description below and the accompanying drawings.

BRIEF DESCRIPTION OF THE DRAWINGS

FIG. 1b is a block diagram of processor 101 of FIG. 1a.

DETAILED DESCRIPTION OF THE PREFERRED EMBODIMENTS

Figure 1A:
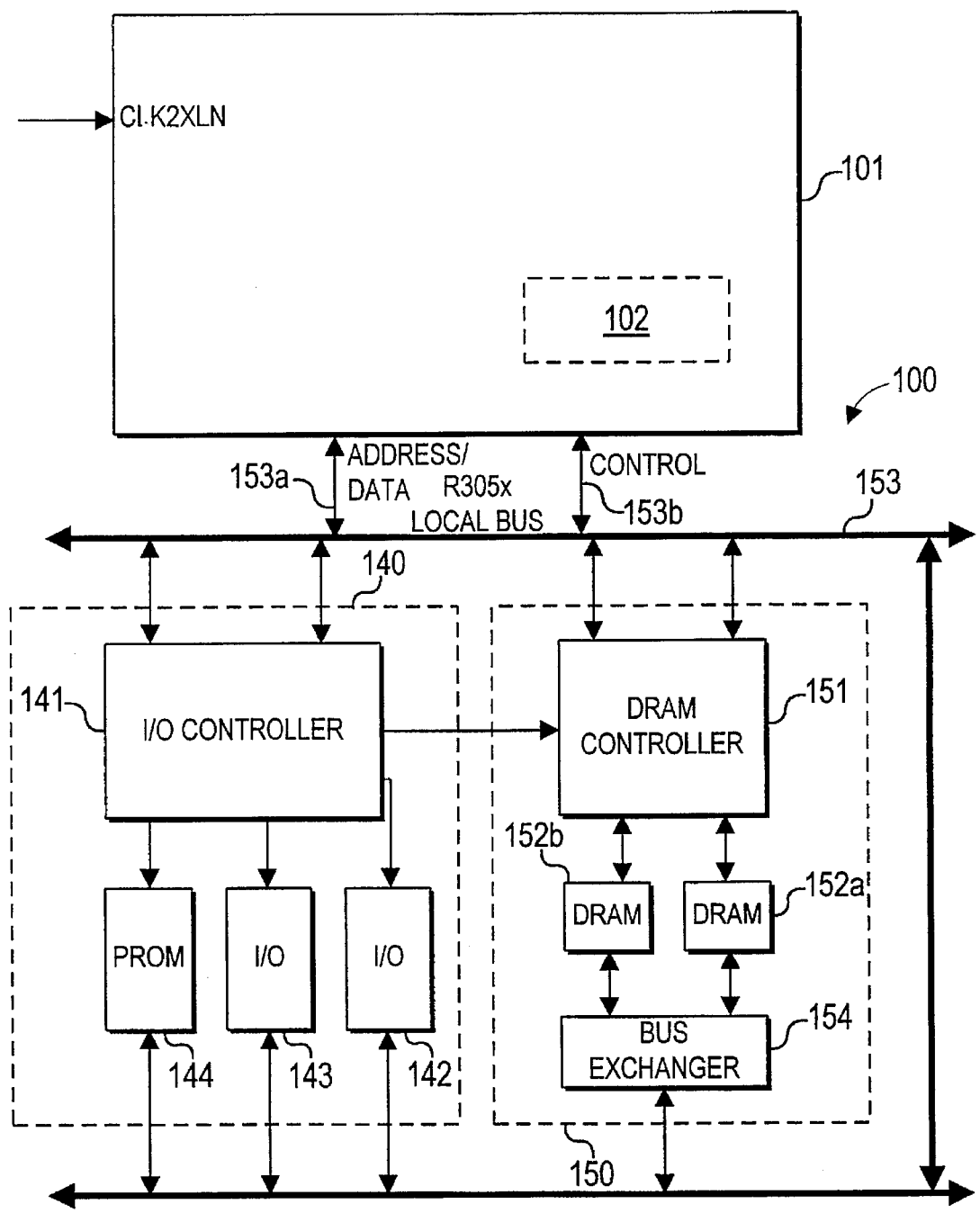
FIG. 1a shows a computer system 100 having a processor 101 with an on-chip instruction cache system 102 and a main memory system 150 external to the processor, in accordance with the present invention.

FIG. 1a shows, as an example, a computer system 100 having a processor 101 with an on-chip cache system 102 and a main memory system 150 external to the processor, in accordance with the present invention. As shown in FIG. 1a, external or read and write memory ("main memory") system 150, which is interfaced to the processor 101 over a bus 153, comprises a dynamic random access memory (DRAM) controller 151, a main memory 152 implemented by banks 152a and 152b of DRAMs and a bus interface 154. In addition, the address space of computer system 100 is also used to access other memory-mapped devices such as I/O controller 141, I/O devices 142 and 143, and programmable read-only memory (PROM) 144. To facilitate reference, the memory-mapped devices other than the main memory 150 defined above are collectively referred to as the I/O system 140, even though read-only memories, such as PROM 144, are often not considered part of the I/O system. I/O system 140 is also interfaced to the bus 153. Bus 153 comprises address/data bus 153a and control bus 153b. Memory data and memory addresses are time-multiplexed on the 32-bit address/data bus 153a. Other device configurations using the memory address space are also possible within the scope of the present invention.

Figure 1B:
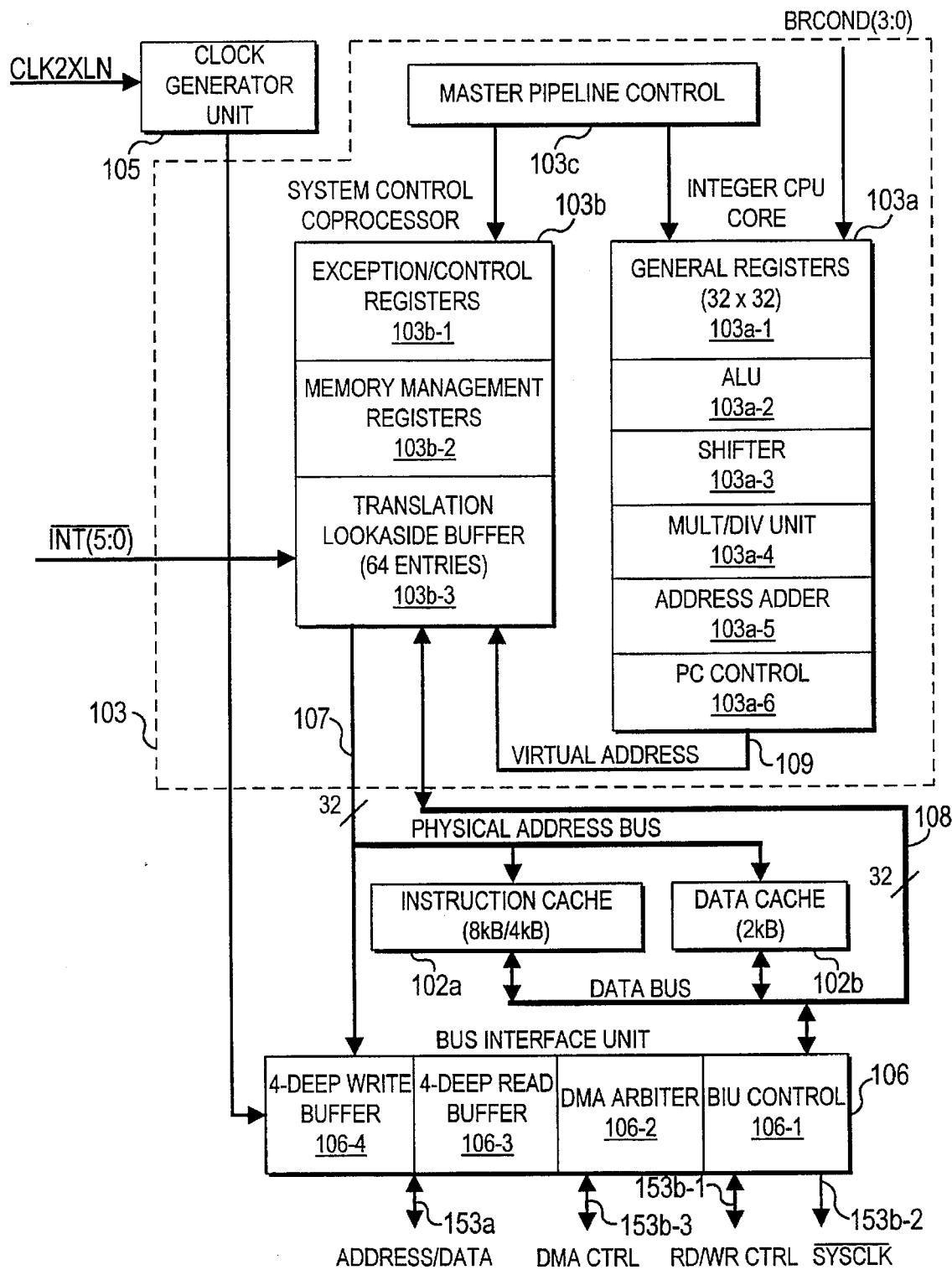

The organization of processor 101 is shown in FIG. 1b. As shown in FIG. 1b, processor 101 includes two co-processors 103a and 103b, controlled by a master pipeline control unit 103c. Coprocessor 103a is also referred to as the integer CPU, and includes 32 32-bit general registers 103a-1, an ALU 103a-2, a shifter 103a-3, a multiplication and division unit 103a-4, an address adder 103a-5, and program counter control unit 103a-6. Processor 103a executes the instruction set known as the MIPS-I Instruction Set Architecture (ISA). Coprocessor 103b, also known as the System Control Coprocessor, comprises exception/control registers 103b-1, a memory management registers unit 103b-2 and a translation look-aside buffer (TLB) 103b-3. The TLB unit 103b-3 provides a mapping between virtual and physical addresses. The TLB unit 103b-3 has a 64-entry look-up table to provide mapping between virtual and physical addresses efficiently. In this embodiment, the TLB unit 103b-3 is provided at the user's option. The TLB unit 103b-3 can be disabled. The above units of the coprocessors 103a and 103b can be implemented by conventional or any suitable design known in the art. The coprocessor units 103a and 103b, and the pipeline control unit 103c are collectively referred to as the CPU core 103.

The cache system 102 of processor 101 comprises two cache memories 102a and 102b. Cache 102a is an instruction cache. In this embodiment shown, the capacity of cache 102a can be 4K or 8K bytes, and block fill and line sizes of four memory words each. Cache 102b is a data cache, and has a selectable block refill size of one or four memory words, a line size of one memory word, and a capacity of 2K bytes. Other cache, block refill and line sizes can be provided within the scope of the present invention. Both the capacities of cache 102a and cache 102b, and their respective block refill and line sizes, are matters of design choice. In addition, it is also not necessary to provide separate data and instruction caches. A joint data and instruction cache is also within the scope of the present invention. The TLB unit 103b-3 receives from the CPU core 103 on bus 109 a virtual address and provides to either cache 102a or cache 102b on bus 107 the corresponding physical memory address. Although cache accessing using virtual addresses is also possible, by using physical addressing in the instruction and data caches, the present embodiment simplifies software requirements and avoids the cache flushing operations necessary during a context switch in a virtually addressed cache. The cache addressing scheme of the present embodiment is discussed below in conjunction with FIG. 2. Other cache addressing schemes are also possible within the scope of the present invention.

Bus interface unit (BIU) 106 interfaces processor 101 with the main memory 150 when a read or write access to main memory is required. BIU 106 comprises a 4-deep write buffer 106-4, a 4-deep read buffer 106-3, a DMA arbiter 106-2 and BIU control unit 106-1. BIU control unit 106-1 provides all control signals on bus 153b, which comprises buses 153b-1 to 153b-3 necessary to interface with the main memory 150 and the I/O system 140. Both addresses and data are multiplexed on the address/data bus 153a, and the control signals are provided on the $\overline{\text{Rd/Wr}}$ control bus 153b-1, the system clock signal 153b-2, and the DMA control bus 153b-3.

Figure 2:
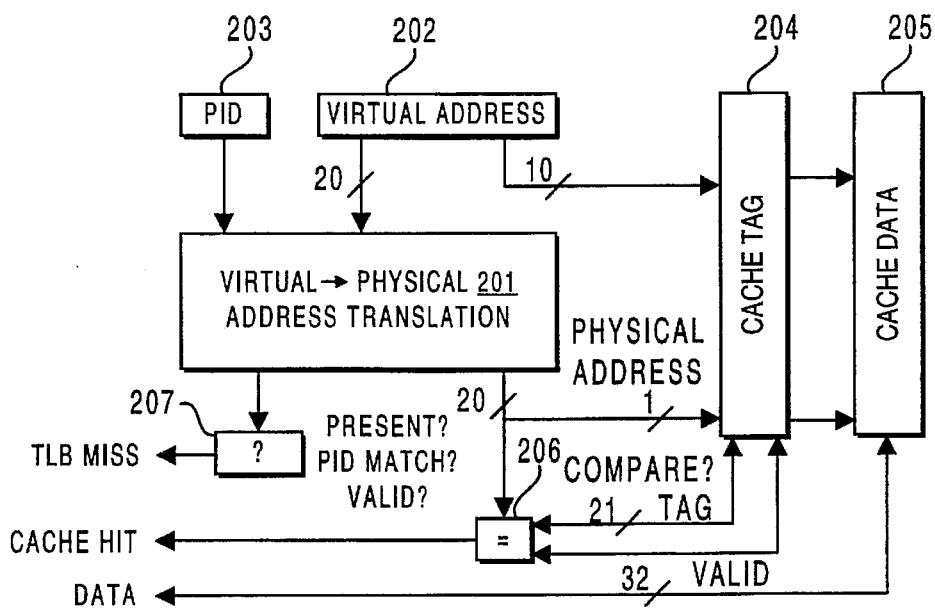
FIG. 2 is a block diagram showing the addressing scheme used in the instruction cache 102a of cache system 102 of FIGS. 1a and 1b.

FIG. 2 is a block diagram showing the addressing scheme used in the instruction cache 102a of the cache system 102, which is shown in FIGS. 1a and 1b. As shown in FIG. 2, the higher order 20 bits of a virtual address (generated by CPU core 103, as shown in FIG. 1b), which is represented by block 202, is provided to the cache addressing mechanism represented by block 201. The remaining 10 bits of the memory word address are common between the virtual and the physical addresses. (The lowest two bits are byte addresses, which are not used in cache addressing.) These common bits are directly provided to index into the cache memory 102a, represented by blocks 204 and 205. Block 205 represents the data portion of the cache line, which comprises four 32-bit memory words in this embodiment. Block 204 represents the "tag" portion of the cache data word; this tag portion contains both a "valid" bit and the higher order 20 bits of the memory word addresses of the data words stored in the cache line. (Since the addresses of memory words within the cache line are contiguous, the higher order 20 bits are common to all of the memory words in the cache line). The valid bit indicates that the cache word contains valid data. Invalid data may exist if the data in the cache does not contain a current memory word. This condition may arise, for example, after a reset period.

Each virtual address is associated with a particular process identified by a unique "process id" PID, which is represented by block 203. Block 201 represents the virtual address to the physical address translation, which is performed using the TLB unit 103b-3 when the TLB is present. (FIG. 1b.) When the TLB is present, a TLB miss occurs if either a mapping between the virtual address and the corresponding physical address cannot be found in the 64 entries of the TLB unit 103b-3, the PID stored in the TLB unit 103b-3 does not match the PID of the virtual address, or if the valid bit in the data word is not set. Block 207 represents the determination of whether a TLB miss has occurred. The TLB miss condition raises an exception condition, which is handled by CPU core 103. If a virtual address to physical address mapping is found, the higher order 20 bits of the physical memory word address is compared (block 206) with the memory address portion of the tag. The valid bit is examined to ensure the data portion of the cache line contains valid data. If the comparison (block 206) indicates a cache hit, the selected 32-bit word in the cache line is the desired data.

If a cache miss is indicated, BIU 106 is invoked and CPU core 103 stalls until BIU 106 indicates that the requested data is available. A cache miss can also be generated when the memory access is to a "uncacheable" portion of memory. When BIU 106 receives a datum from main memory, the CPU core 103 executes either a "refill", a "fix-up", or a "stream" cycle. In a refill cycle, an instruction datum received (in the read buffer 106-3) is brought into the cache 102a. In a fix-up cycle, the CPU core 103 transitions from a refill cycle to execute the instruction brought out of the read buffer 106-3. In a stream cycle, the CPU core 103 simultaneously refills cache memory 102a and executes the instruction brought out of the read buffer 106-3. For uncacheable references, the CPU core 103 executes a fixup cycle to bring out the fetched memory word from the read buffer 106-3, but the uncacheable memory word is not brought into the cache memory 102a. Otherwise, the CPU core 103 executes refill cycles until the miss address is reached. At that time, a fixup cycle is executed. Subsequent cycles are stream cycles until the end of the 4-memory word block is reached and normal run operation resumes. If sequential execution is interrupted, e.g. a successful branch condition, refill cycles are executed to refill the cache before execution is resumed at the branch address.

The operation of the data cache 102b is similar to that of instruction cache 102a, except that only one fixup cycle is used after one or four refill cycles, depending upon the refill block size selected. Because the size of the data caches is 2K bytes, a 21-bit "tag" is required. Hence, because of the different sizes of the instruction and data caches, the data cache's tag is 1 bit longer than the instruction cache's tag. In order to have the data and instruction caches share a common cache addressing scheme, the instruction cache routes one of its lower order address bits back as a tag bit, so as to appear as if the tag portion of the instruction cache is 21-bit. If the refill block size selected for the data cache is four memory words, as will be apparent below, the present invention provides the same benefit in the data cache as in the instruction cache.

Figures 3A, 3B:
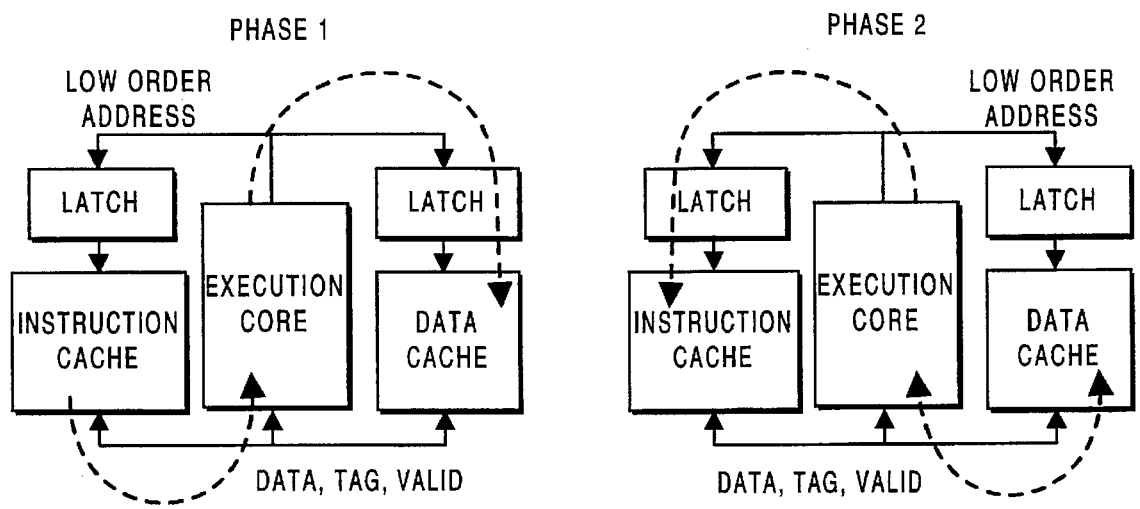
FIGS. 3a and 3b show respectively the first and second phases of a "run" cycle of the CPU core 103.

The execution of an instruction in the CPU core 103 is called a "run" cycle. The run cycle, which comprises two phases, is illustrated by FIGS. 3a and 3b. As shown in FIG. 3a during the first phase ("data phase"), a data cache (cache 102b) address is presented and a previous instruction cache (cache 102a) read is completed. During the second phase (the "instruction" phase, shown in FIG. 3b), data found resident at the data cache address presented in the first phase is read into the CPU core 103, and an address corresponding to the next instruction is issued to instruction cache 102a.

Figure 4A:
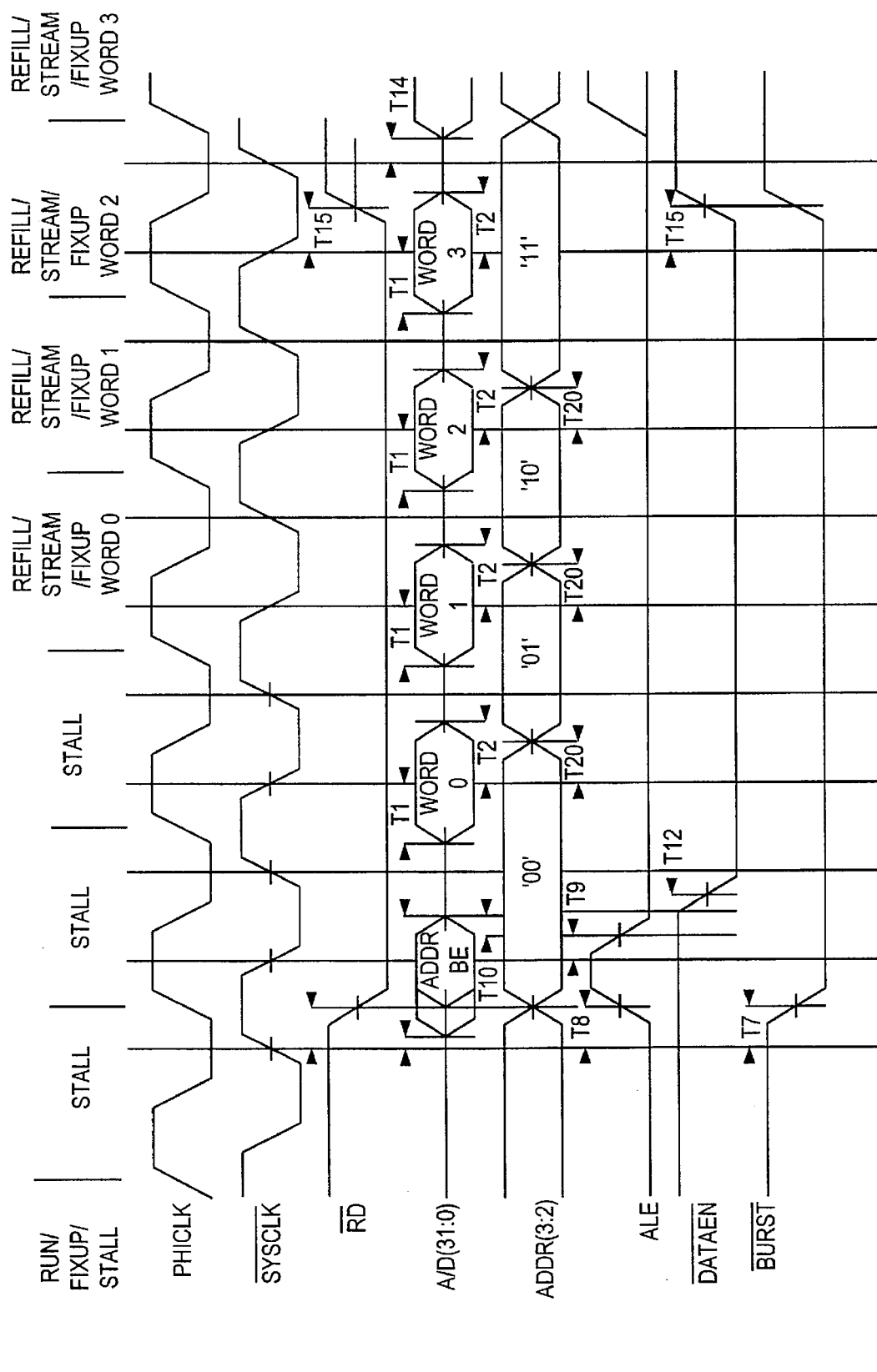
FIGS. 4 shows a timing diagram of a multiple read operation using both the $\overline{\text{RdCEn}}$ and $\overline{\text{Ack}}$ signals with no wait cycles, in accordance with the present invention.

In order to refill a cache miss in the instruction cache 102a, four words of contiguous addresses are brought into the read buffer 106-3 (FIG. 1b). The present invention provides flexibility to support memory systems of numerous variations in organization and performance. FIG. 4 is a timing diagram of a refill operation in a memory system capable of supporting the fastest block read. FIG. 4 shows that both the processor clock (PhiClk) and the bus clock ($\overline{sysclk}$). PhiClk is used, for example, inside the integer CPU 103 to control the execution units such as ALU 103a-2, general registers 103a-1 etc. $\overline{SysClk}$ is used in bus transactions on bus 105a, for example, and is provided off-chip. Off-chip timing are provided relative to $\overline{SysClk}$. As shown in FIG. 4, when a cache miss or an uncacheable reference occurs, the CPU core 103 stalls and a memory read cycle is initiated by bringing the read ($\overline{Rd}$) signal to logic low following the rising edge of $\overline{sysclk}$ at time $T_I$. Simultaneously, the word address of the desired memory word to be transferred is placed on bus 105a (i.e. A/D[31:0] and Addr[3:2]). In this embodiment, only the higher order 28 bits of bus 103a are used for the memory address. Each bit of the lower order 4 bits (i.e. A/D [3:0]) of bus 105a is associated with one of the four bytes of bus 105a, and indicates whether the associated byte is involved in the subsequent data transfer. The lower two bits of the memory word address are in fact provided on separate bus lines Addr[3:2]. These two bits indicate which of the four memory word in the block is being transferred, e.g. at the time $\overline{Rd}$ is asserted, Addr[3:2] indicate that word 0 of the 4-memory word block is transferred and, at the time the last word in the burst read is transferred, indicate word 3 of the 4-memory word block is transferred. The address latch enable (ALE) signal is asserted to indicate that bus 105a contains a memory address. The burst ($\overline{Burst}$) signal, which is not asserted for a single-word read, indicates that the current read transfers a four-word block. During the address phase, the control signals Diag[1:0] indicate respectively whether the memory access arises because of a missed cacheable reference or an uncacheable reference, and whether the cache miss is in the data cache or the instruction cache.

Following the falling edge of the $\overline{sysclk}$ signal at time $T_2$, the processor relinquishes bus 105a by asserting the data enable ($\overline{DataEn}$) signal. In FIG. 4, which illustrates the fastest block read possible, the first memory word arrives from the main memory as soon as bus 105a is relinquished by processor 101. In a single-memory word read operation, the read cycle is completed after receiving this first memory word. The arrival of each memory word on bus 105a (i.e. A/D[31:0]) is signalled by the main memory using the read buffer clock enable ($\overline{RdCEn}$) signal. Processor 101 samples bus 105a at the falling edge of the $\overline{\text{sysclk}}$ signal (e.g. times $T_3$, $T_5$, $T_7$ and $T_9$) following detection of the $\overline{\text{RdCEn}}$ signal at the previous rising edge of the $\overline{\text{sysclk}}$ signal (e.g. $T_4$, $T_6$, $T_8$ and $T_{10}$). During these times, the Diag[1:0] signals indicate the least significant two bits of the memory reference which results in the main memory access. Because, as shown in FIG. 4, the main memory is able to deliver a memory word every $\overline{\text{sysclk}}$ period, the main memory system asserts the acknowledge ($\overline{\text{Ack}}$) signal simultaneously with the first $\overline{\text{RdCEn}}$ signal. The $\overline{\text{ACK}}$ signal indicates that if processor 101 begins emptying the buffer at the clock period after the first memory word is loaded in the read buffer 106-3, the remaining words in the block read are available to CPU core 103 without intervening wait cycles. The $\overline{\text{Rd}}$, $\overline{\text{Burst}}$ and $\overline{\text{DataEn}}$ signals are active until after the last word in the block read are received. CPU core 103 does not execute any stall cycles after the first memory word is available from the read buffer 106-3.

Figure 5A:
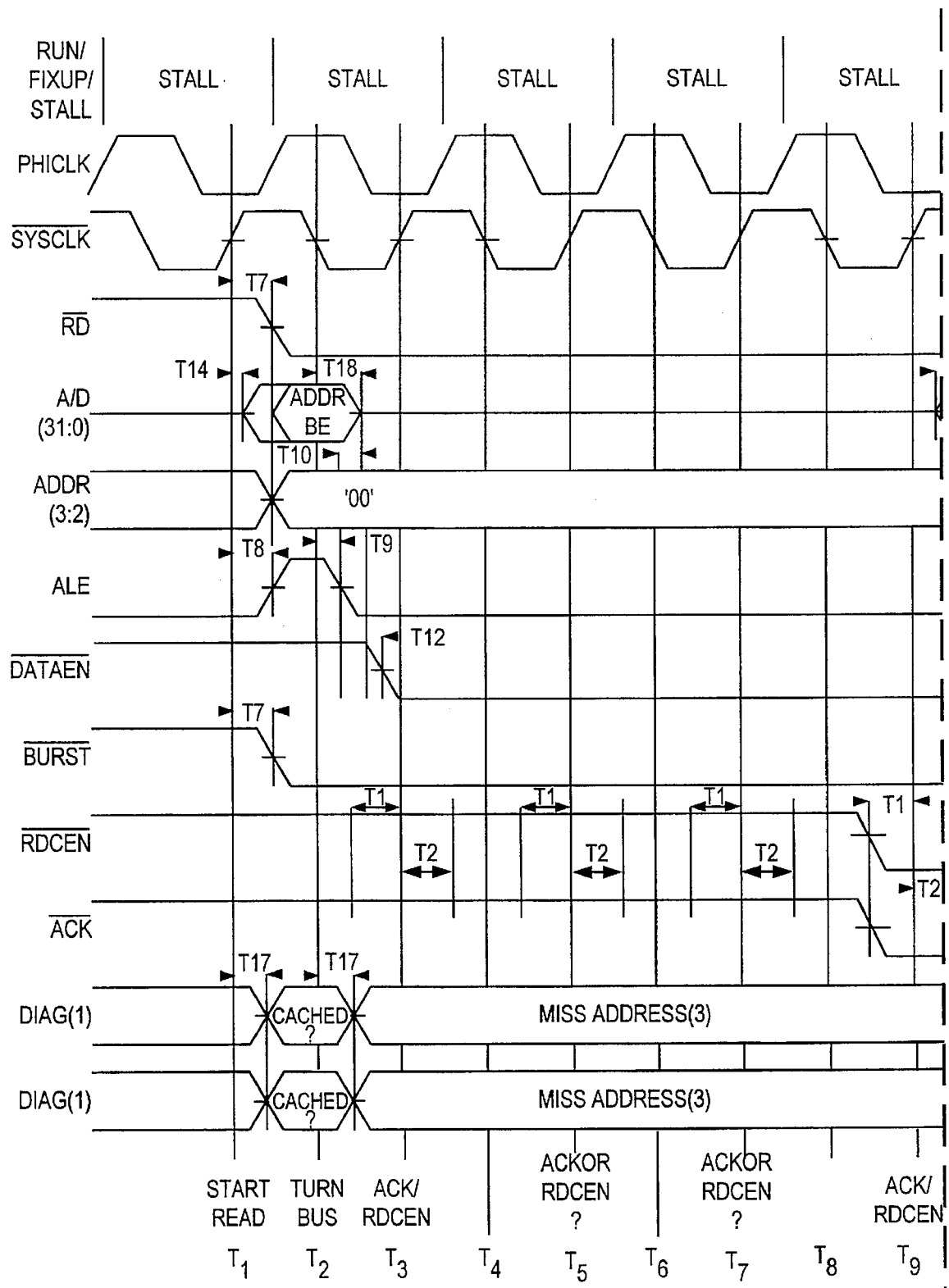
FIG. 5 is a timing diagram for a multiple read operation, in which both the $\overline{\text{RdCEn}}$ and the $\overline{\text{Ack}}$ signals arrive after initial wait cycles, in accordance with the present invention.
Figure 5B:
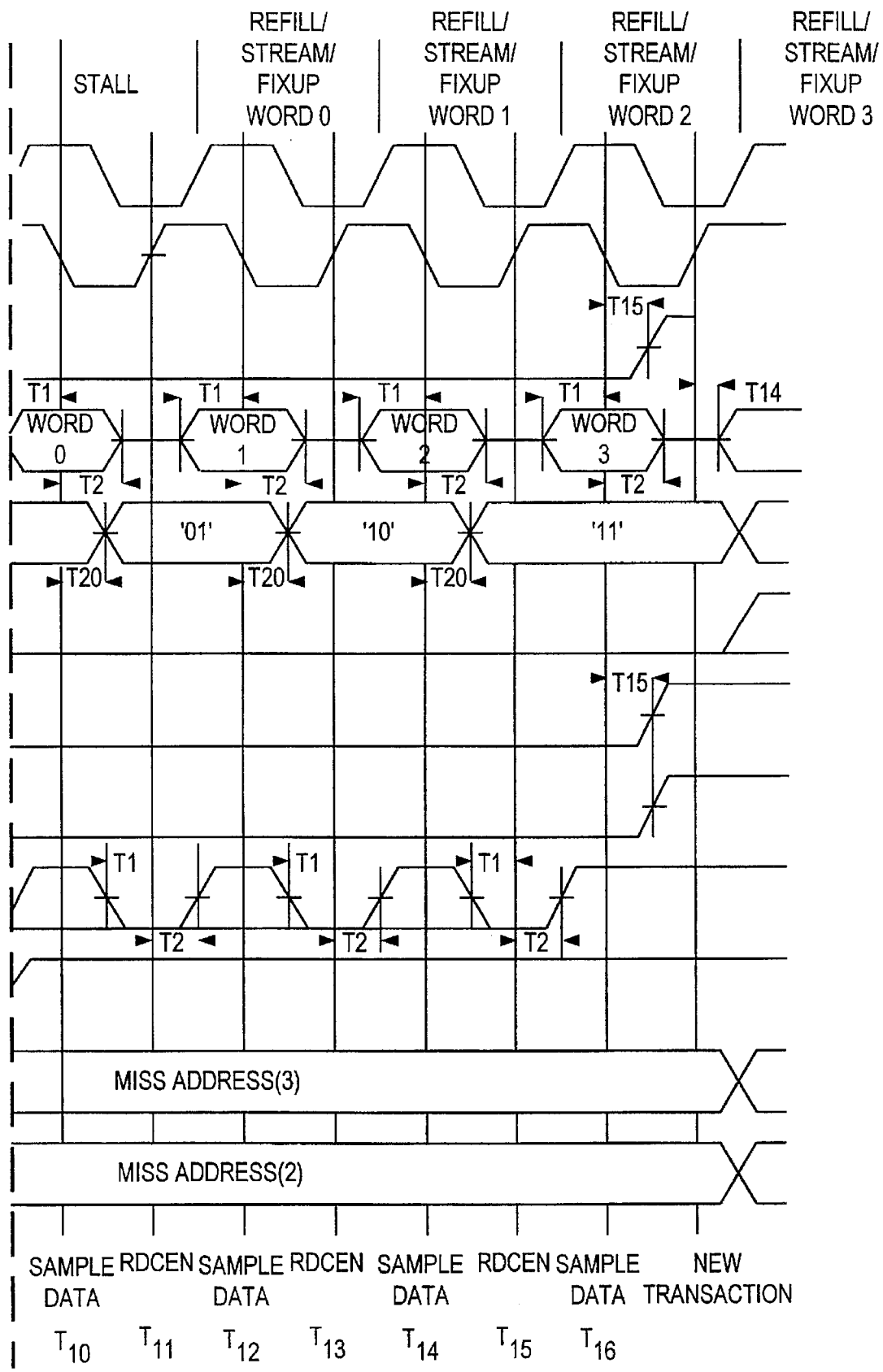

FIG. 5 is a timing diagram showing initial wait cycles before the $\overline{\text{RdCEn}}$ and $\overline{\text{Ack}}$ signals arrive. In FIG. 5, the read cycle is initiated in the same manner as described for FIG. 4 prior to time $T_2$. However, unlike FIG. 4, the $\overline{\text{RdCEn}}$ signal did not arrive until time $T_9$—i.e. three $\overline{\text{sysclk}}$ periods after the $\overline{\text{Rd}}$ signal becomes active. Like FIG. 4, in this instance, the $\overline{\text{RdCEn}}$ signal is asserted every $\overline{\text{sysclk}}$ clock period thereafter indicating that a memory word arrives on bus A/D[31:0] every clock period. Hence, since the main memory can provide one memory word per $\overline{\text{sysclk}}$ period, the $\overline{\text{Ack}}$ signal is provided simultaneously with the first $\overline{\text{RdCEn}}$ signal. CPU core 103 executes stall cycles until after time $T_{11}$, when word 0 appears at the output terminals of the read buffer 106-3 on bus 108 (FIG. 1b).

Figure 6A:
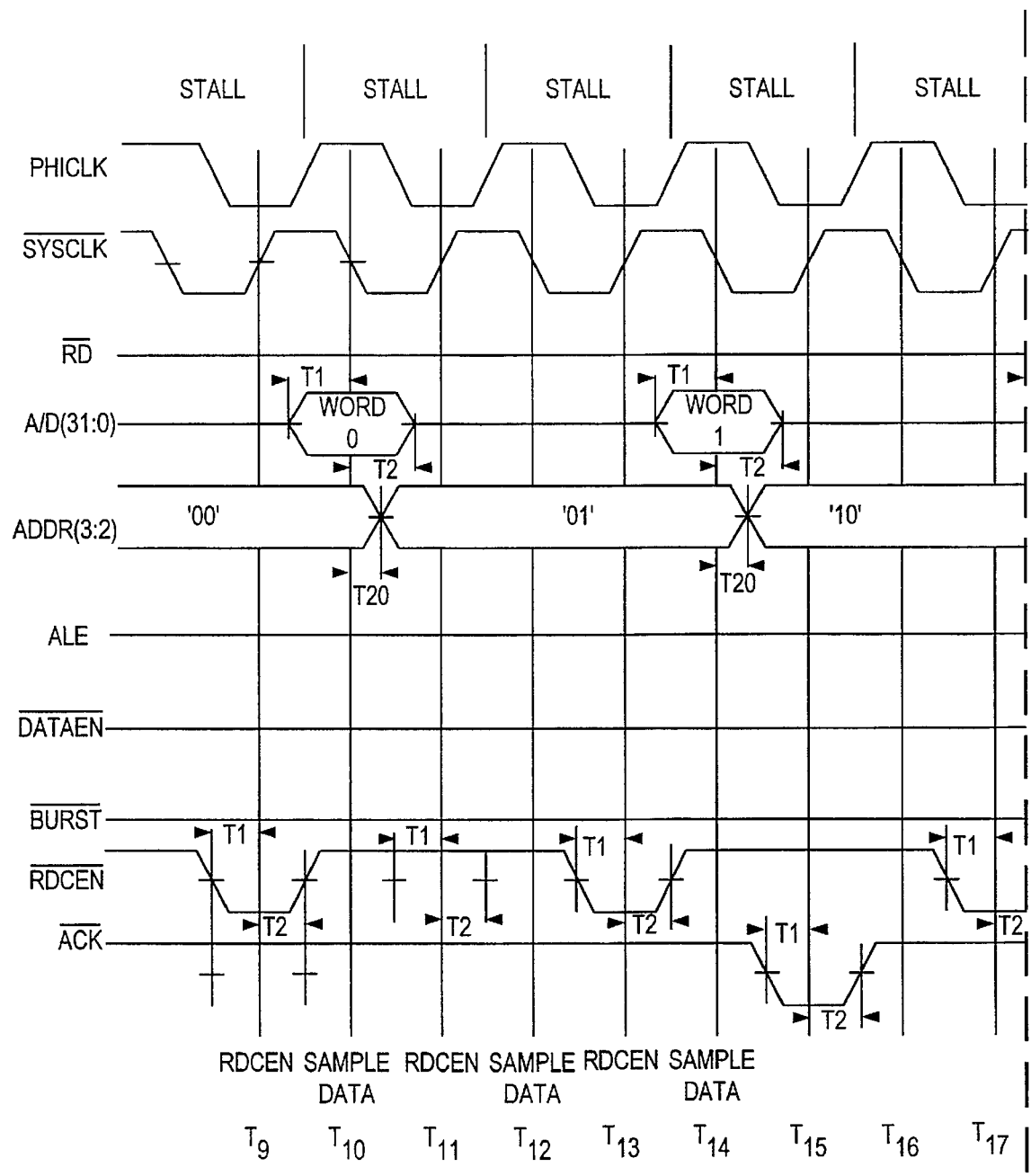
FIG. 6 is a timing diagram for a multiple read operation in which wait cycles are executed both prior to the arrival of the $\overline{\text{RdCEn}}$ and $\overline{\text{Ack}}$ signals and between words returned, in accordance with the present invention.
Figure 6B:
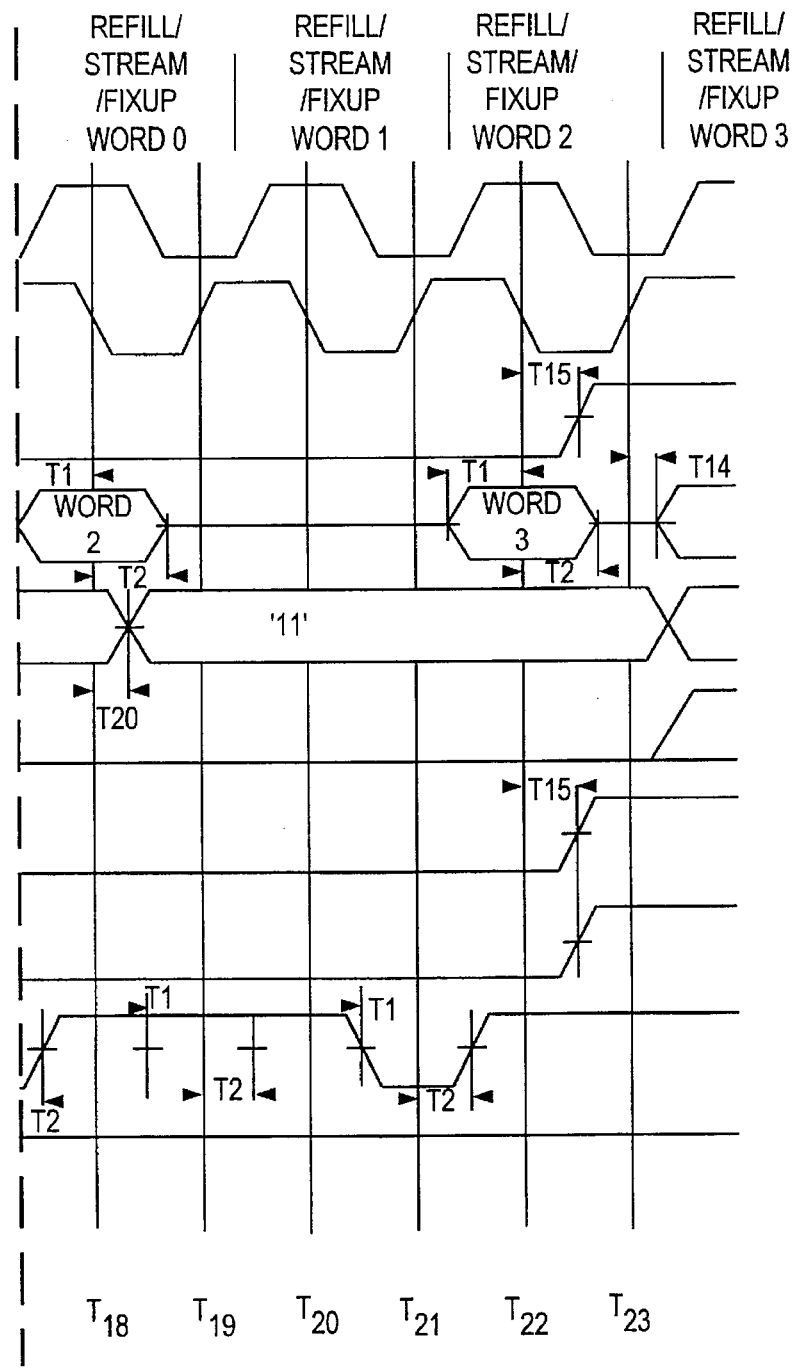

FIG. 6 is a timing diagram for a multiple read operation in which wait cycles are required both preceding the arrivals of $\overline{\text{RdCEn}}$, and between words returned, until the $\overline{\text{Ack}}$ signal is received. The signal transitions previous to time $T_9$ are substantially the same as discussed in conjunction with FIG. 5, and are therefore not described here again. However, FIG. 6 illustrates a main memory system having lower bandwidth than either main memory systems described in conjunction with FIG. 4 or FIG. 5. As shown in FIG. 6, after $\overline{\text{RdCEn}}$ is sampled active at time $T_9$ and the first memory word is sampled at time $T_{10}$, the $\overline{\text{RdCEn}}$ signal is not sampled active again until time $T_{13}$ (i.e. the main memory system provides a memory word every two $\overline{\text{sysclk}}$ periods). The $\overline{\text{Ack}}$ signal is not asserted until 3.5 $\overline{\text{sysclk}}$ clock periods (i.e. after the falling edge of $\overline{\text{sysclk}}$ at time $T_{14}$) prior to providing the last memory word of the block at time $T_{20}$. The $\overline{\text{Ack}}$ signal is provided at this time so that the CPU core 103 can initiate cache refill, fixup and stream cycles, as appropriate, one clock period (i.e. following the rising edge of the $\overline{\text{sysclk}}$ signal at time $T_{17}$) after the $\overline{\text{Ack}}$ signal is sampled active at time $T_{15}$. In this manner the last word of the block is available to CPU core 103 from the read buffer 106-3 without having to execute any intervening stall cycles after receiving the $\overline{\text{Ack}}$ signal, since the last memory word of the block is made available when the CPU core requires it at time $T_{21}$. Since the memory word is returned at less than one memory word per processor period, this read operation is a form of "throttled" read.

In this embodiment, if the $\overline{\text{Ack}}$ signal is not sampled to be asserted at any time prior to the last $\overline{\text{RdCEn}}$ signal of the block is sampled, the Ack signal is assumed to be sampled asserted at the time of receiving the last $\overline{\text{RdCEn}}$ signal, regardless if $\overline{\text{Ack}}$ is actually asserted. This condition is known as "implicit acknowledgement." Under implicit acknowledgment mode, refill begins after the fourth (final) word of the block is provided to the read buffer. Thus, the CPU executes three or more stall cycles than necessary under the implicit acknowledgment condition.

The benefit of the $\overline{\text{RdCEn}}$ and $\overline{\text{Ack}}$ signals are provided without incurring any performance penalty on single word read operations. Also, since the processor may execute instructions at the rate of the processor clock once the $\overline{\text{Ack}}$ signal is received, the processor is optimally matched to the main memory.

Figure 7:
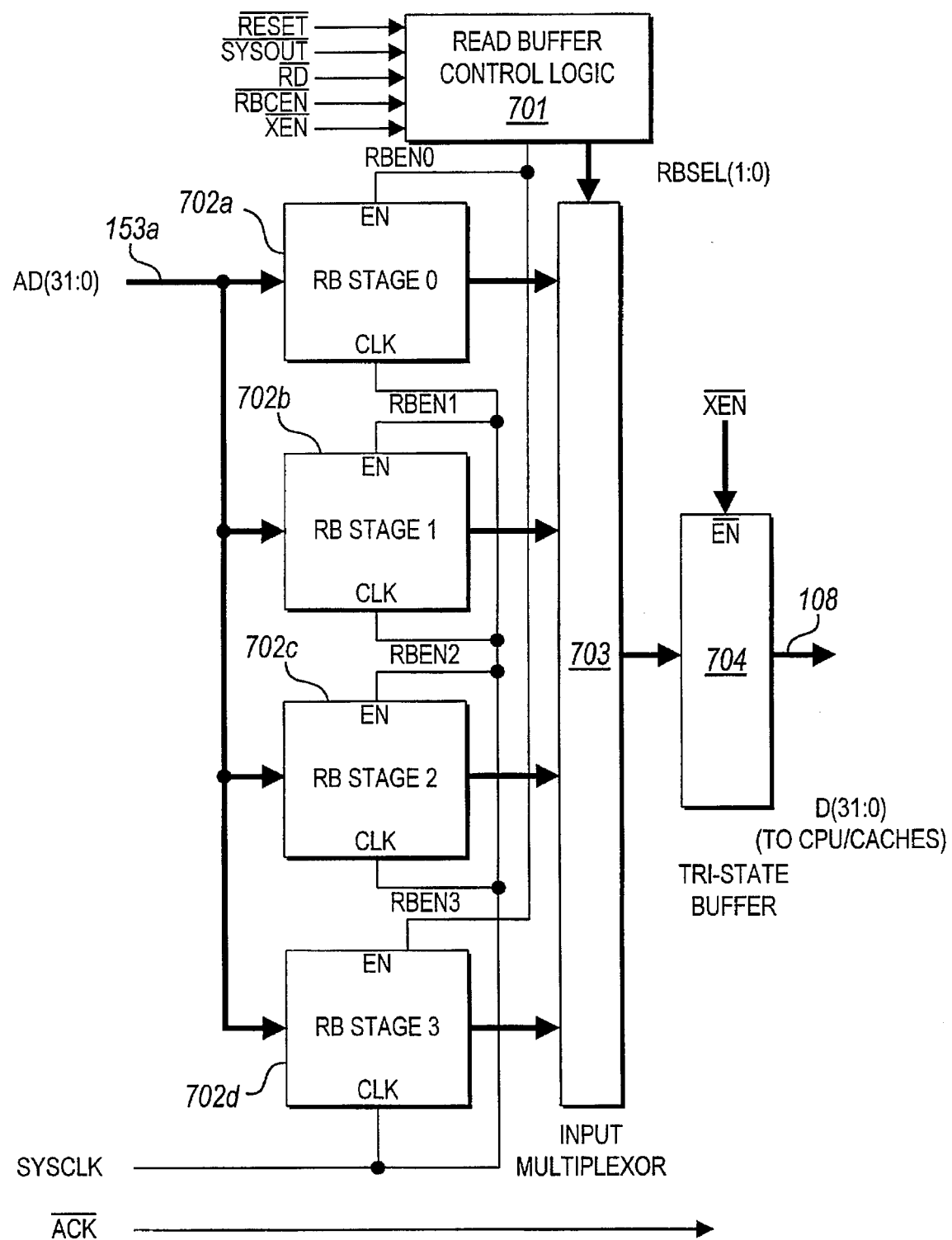
FIG. 7 is a schematic diagram of a read buffer 700, in accordance with the present invention.

FIG. 7 is a schematic diagram of a 4-deep read buffer circuit 700 suitable for use as the read buffer 106-3 shown in FIG. 1b. As shown in FIG. 7, four buffer registers 702a–d form the 4-deep read buffer. Each buffer is associated with one of the four load control signals RBEn0–RBEn3, and loads at the appropriate edge of the Sysclk signal the 32-bit data on the address/data bus 153a (AD[31:0]) upon receiving the associated signal from the control logic 701. A multiplexor 703 selects the datum of one of the read buffer registers 702a–d for output to the data bus 108 (see FIG. 1a also). The data selected is placed on bus 108 upon receiving an enable signal $\overline{\text{XEn}}$ which activates the tristate buffers 704.

Figure 8:
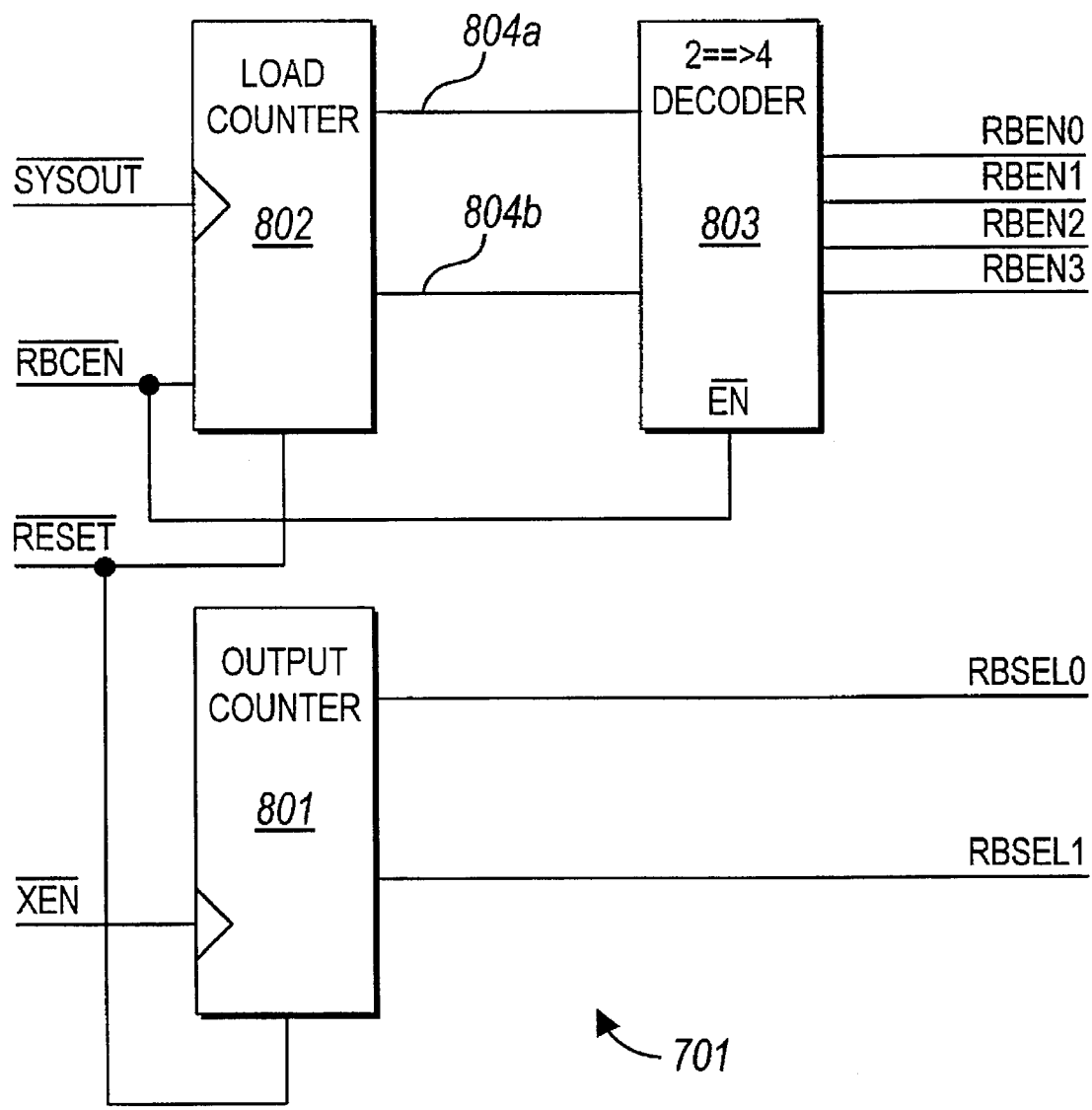
FIG. 8 is a schematic diagram of the control logic block 701 of the read buffer 700 shown in FIG. 7.

FIG. 8 is a schematic diagram of the control logic 701 shown in FIG. 7. As shown in FIG. 8, control logic 701 comprises output counter 801, load counter 802, and decoder 803. As each $\overline{\text{RdCEn}}$ signal is received, the load counter 802 is incremented at the appropriate edge of the $\overline{\text{SysOut}}$ clock signal. The signals on output terminals 804a and 804b are then decoded by decoder 803 to provide one of the four control signals RBEn0–RBEn3 for loading the data on bus 153a into one of the four buffer registers 702a–d (FIG. 7). Note that the $\overline{\text{Ack}}$ signal is not received in the read buffer 106-3. Instead, the $\overline{\text{Ack}}$ signal is received at the CPU core 102a as a read busy signal ($\overline{\text{RdBusy}}$) signal. When the CPU core 102a empties the read buffer 106-3, such as to refill the instruction cache 102a, the $\overline{\text{XEn}}$ signal is sent to both output counter 801 and the tristate buffers 704. The output counter 801 is incremented for each $\overline{\text{XEn}}$ signal received to provide the selection signals RBSel0 and RBSel1 for multiplexor 703 to select the data in one of the read buffer registers 702a–d. The $\overline{\text{XEn}}$ signal also activates the tristate buffers 704 to place the selected data onto the bus 108.

The above detailed description are provided to illustrate the specific embodiments of the present invention, and is not to be taken in a limited sense. Numerous variations and modifications within the scope of the present invention are possible. The present invention is defined by the following claims.

We claim:

1. A structure for receiving a plurality of memory words from a memory, comprising:

a buffer for receiving said plurality of memory words one memory word at a time and for outputting said plurality of memory words one memory word at a time in response to a control signal, said buffer receiving an enable signal from said memory, said enable signal, when asserted, indicating a memory word ready to be received by said buffer; and a processor operating at a predetermined clock rate receiving an acknowledgement signal from said memory, said acknowledgement signal, when asserted, indicating that said processor can begin to empty said plurality of memory words from said buffer at said predetermined clock rate without wait cycles, said memory generating said acknowledgement signal prior to completing transfer of all of said plurality of memory words into said buffer, said processor generating, upon receiving said asserted acknowledgement signal, said control signal to enable said buffer to output said memory words.

2. A structure as in claim 1, further comprising a cache memory for storing said plurality of memory words output from said buffer.

3. A structure as in claim 2, wherein said plurality of memory words form a cache line in said cache memory.

4. A structure as in claim 2, wherein said cache memory means comprises an instruction cache and a data cache.

5. A structure as in claim 2, wherein said plurality of memory words are fetched from said memory when said processor fail to obtain the content of one of said memory words from said cache.

6. A structure as in claim 2, wherein said processor, buffer and cache are provided on the same integrated circuit.

7. A structure as in claim 1, further comprising a counter for maintaining a count of said plurality of memory words received, said buffer being emptied at said predetermined clock rate if said acknowledgement signal is not received by said processor from said memory when said count reached a predetermined number.

8. A method for receiving a plurality of memory words from a memory, comprising the steps of:

providing a buffer for receiving said plurality of memory words one memory word at a time and for outputting said plurality memory words one memory word at a time in response to a control signal, said buffer receiving an enable signal from said memory, said enable signal when asserted, indicating a memory word ready to be received by said buffer;

receiving, in a processor operating at a predetermined clock rate, an acknowledgement signal from said memory, said acknowledgement signal, when asserted, indicating that said processor can begin to empty said plurality of memory words from said buffer at said predetermined clock rate without wait cycles, said memory generating said acknowledgement signal prior to completing transfer of all of said plurality of memory words into said buffer; and generating in said processor, upon receiving said acknowledgement signal, said control signal for enabling said buffer to output said memory words.

9. A method as in claim 8, further comprising the step of storing in a cache said plurality of memory words output from said buffer.

10. A method as in claim 9, wherein said plurality of memory words form a cache line in said cache memory.

11. A method as in claim 9, wherein said storing step provides a cache memory comprising an instruction cache and a data cache.

12. A method as in claim 9, wherein said plurality of memory words are fetched from said memory when said processor fail to obtain the content of one of said memory words from said cache.

13. A method as in claim 9, wherein said step of receiving in a processor a second signal from said memory, said step of providing a buffer, and said step of storing in a cache are performed on the same integrated circuit.

14. A method as in claim 1, further comprising the steps of:

maintaining a count of said plurality of memory words received; and emptying said buffer at said predetermined clock rate, if said asserted acknowledgement signal is not received by said processor from said memory when said count reached a predetermined number.

* * * * *